United States Patent [19]

Chang

[11] 4,207,180

[45] Jun. 10, 1980

[54] GAS-LIQUID REACTION METHOD AND APPARATUS

[76] Inventor: Shih-chih Chang, 2339 Davison Ave., Richland, Wash. 99352

[21] Appl. No.: 2,738

[22] Filed: Jan. 11, 1979

[51] Int. Cl.² .............................................. C02C 1/08
[52] U.S. Cl. ......................................... 210/7; 210/12; 210/14; 210/15; 210/180; 210/195.1; 210/220; 261/36 R; 261/151; 261/152; 261/DIG. 27; 261/DIG. 75; 435/262; 435/314; 435/316
[58] Field of Search ............... 195/142, 143, 109, 313, 195/314, 316; 435/243, 262; 210/7, 14, 12, 15, 63 R, 60, 194, 195 R, 220, 221 R, 137, 177, 180, 188; 261/29, 36 R, 151, 152, 155, DIG. 27, DIG. 75

[56] References Cited

U.S. PATENT DOCUMENTS

| 2,353,926 | 7/1944 | Peters ..................... 261/155 |
| 3,371,618 | 3/1968 | Chambers ............... 261/DIG. 75 |
| 3,547,815 | 12/1970 | McWhirter .............................. 210/7 |
| 3,826,742 | 7/1974 | Kirk ................................. 210/63 R |
| 3,945,922 | 3/1976 | Jagusch et al. ................. 210/220 |
| 4,017,565 | 4/1977 | Muller ..................... 261/DIG. 75 |
| 4,018,859 | 4/1977 | Muller ...................... 195/143 |
| 4,043,771 | 8/1977 | Anand ........................ 210/220 |
| 4,098,820 | 7/1978 | Couteau ................. 261/DIG. 75 |

FOREIGN PATENT DOCUMENTS

95365  4/1921  Switzerland ............................. 261/29

*Primary Examiner*—Ernest G. Therkorn

[57] ABSTRACT

A method and an apparatus for promoting gas-liquid reaction in a reactor comprise pumping the reacting liquid to a predetermined height in a flow conduit. Gas is admitted to the liquid flow course to affect entraining gas in the flowing liquid and forming a gas-liquid mixture in the flow conduit. Said gas-liquid mixture is then guided to flow downwardly in a sustaintially vertical tube and subsequently discharged in a submerged eductor means for inducing a secondary circulating flow in the reactor. The circulating flow of the reactor liquid disperses the discharged gas homogeneously throughout the reactor and promotes a effective gas-liquid mass transfer.

20 Claims, 3 Drawing Figures

GAS-LIQUID REACTION METHOD AND APPARATUS

BACKGROUND OF THE INVENTION

The present invention relates to a process and an apparatus for promoting gas-liquid reaction in a reactor vessel. It relates particularly to introducing oxygen to liquid medium of fermentation and dissolving oxygen into wastewater for aerobic treatment of sewerage.

Contacting of a gas with a liquid for the purpose of mass transfer and promoting of chemical reaction is a very important unit operation in chemical industry. The reaction may take place with or without the presence of a solid phase as a reactant or as a product. In the fermentation process the provision of oxygen and temperature control of the reaction are the most important factors, in which oxygen is dissolved in the liquid and subsequently supplied to the microbial cells to maintain their growth. Meanwhile, the reaction heat must be removed by heat exchange process for keeping the reaction at an optimum reaction temperature in order to obtain the best yield. Similar principle applies to wastewater biological process. The oxygenation of wastewater supplies oxygen to the biomass of the reactor liquid which promotes the growth of sludge and results in bacterial decomposition of the dissolved organic impurities.

A common known manner of mixing a gas with a liquid is to introduce gas under pressure near the bottom of the reactor and to permit the injected gas to bubble up through the liquid. Submerged diffusers are generally used for breaking up the gas into fine bubbles and distributing them more or less homogeneously over the reactor. Gas is transferred by the continuous contact of the fine bubbles with the liquid. In this method the mixing is limited by the gas compression power, it is therefore not very efficient in the sense of gas dissolution per unit power consumption due to lack of turbulent mixing in the liquid phase. Furthermore, the mechanical system involves extensive pipe lines, distribution manifolds, diffusers and expensive gas compressors and gas filtration system. It therefore requires high capital costs and high power cost. In addition, the maintenance of this system is very troublesome due to the frequent plugging of the diffusors, especially when the reaction is in presence of solids such as industrial fermentation and aerobic wastewater treatment.

Another known method for gas-liquid mixing, so called submerged agitating system, uses mechanically rotational agitators to intensify the turbulent mixing in the reactor liquid. Pressurized gas is introduced to the effective agitating area through pipe openings or through spargers in the form of coarse bubbles which are then broken up into small bubbles by the mixing power of the a mechanical agitator. The efficiency with which the power transmitted through mechanical agitator is generally greater than that with which it is transmitted through gas compression. Agitation also increases the residence time of the bubbles in the liquid and such prolonged residence time is very beneficial for gas-liquid mass transfer. However, the advantage of higher efficiency is somehow counterbalance by the relative complications of the mechanical system which includes submerged agitators, driving motors, gear reducers, long shafts, shaft seals in addition to the expensive gas compression system.

A common disadvantage of the above methods is that the reacting gas can be only partially dissolved due to the limitation of the gas residence time in the liquid. This characteristic is particularly undesirable when the reacting gas component is only slightly dissolvable or when the accompanied reaction is slow. For example, oxygen soluablity in water is only about 10 part per million at normal temperature. A submerged diffusor system can in general dissolve about 10% injected oxygen in water while a submerged agitating system can achieve about 20% oxygen absorption. In order to utilize the reacting gas more efficiently and more economically, gas must be recollected from the gas space of the reactor and recompressed before recirculating to the body of liquid. If the gas contains reactive, corrosive or explosive components, the process of gas recompression may be very difficult and costy. For example, the contact of high purity oxygen with compressor lubricant can couse dangerous explosion. As a consequence, specially designed oxygen compressor are required. The difficulty of the compressor design not only increases the plant capital cost but also damages the process reliability. In fact this is the main reason that the submerged diffuser system is not general applied to oxygen wastewater treatment.

OBJECTS OF THE INVENTION

An object of the present invention is to provide a improved method and apparatus for gas-liquid contacting in a reactor which combines the various advantages of the above described systems and overcome certain disadvantages.

Another object of the present invention is to provide a gas-liquid contacting apparatus which has ultimated mechanical simplicity and high power efficiency.

Still another object of the present invention is to provide a gas-liquid reaction method which circulates the gas to the liquid as frequently as desired so that an optimum utilization of the reacting gas component can be achieved.

Still a further object of the present invention is to provide a method of gas-liquid reaction in the presence of solid phase which provides mixing power and liquid circulation to keep the solids in suspension.

Still another further object of the present invention is to provide a method for gas-liquid reaction in which heat exchange is included for controlling the thermal condition of the reaction.

SUMMARY OF DISCLOSURE

The process described herein comprises continuously pumping the reacting liquid to a predetermined height above the liquid surface within a flow conduit. By a hydraulic principle the local pressure in a liquid conduit decreases with increase of elevation. Therefore the hydraulic pressure can be reduced to a level below the reactor gas pressure at certain height. At this specific height gas is admitted to the flow course and it is entrained in the flow conduit to form a two phase mixture therein. The gas-liquid mixture is then guided to flow downwardly and subsequently discharged in an eductor means below the reactor liquid level. Said eductor means is submerged in the reactor liquid with the inlet and the outlet open to the reactor liquid. The discharged gas-liquid mixture in said eductor means, which acts as a driving jet, induces a secondary flow circulating through the eductor means in the reactor. The gas phase in the two-phase mixture is further mixed with the secondary flow in the eductor means and then discarged to the main body of the reactor liquid through the outlet of the eductor means. The gas bubbles are further homogeneously distributed in the reactor liquid by the action of the secondary circulating flow before they escape from the liquid body. The escaped gas is automatically recollected in the gas space of the reactor which is then recirculated to the liquid flow conduit by self-entrainment as described above until the desired absorption rate is reached.

An apparent advantage of the present invention over the existing systems is that gas can be recirculated by self-entrainment which requires no moving component in contact with the reacting gas. Thereby the design and safty problems of the recirculating gas compressor are eliminated.

Another advantage of the present invention is the mechanical simplicity. The only moving component required is the circulating pump which can be in general satisfied by a commercial centrifugal pump. It is well known that centrifugal pumps are most cost effective and maintenance free component, particularly in comparison with the mechanical units of orther gas-liquid mixing systems. This in turn results in significant reductions in capital and maintence costs in gas-liquid reaction process.

Another advantage of the present invention is that the present method has great process flexibility. The overall power consumption is transmitted to the reactor by the circulating pump through the liquid in the hydraulic form while gas is entrained and compressed by the flow action. By controlling of gas entrainment rate the desired energy distribution between gas compression and turbulence mixing can be obtained.

Another advantage of the present invention is that thermal control of the reactor liquid can be achieved by a heat exchange surface disposed in the turbulence mixing zone, for example, inside the eductor means, or by a external heat exchanger connected to the circulating liquid flow. No additional mixing components are required for heat transfer purpose.

DESCRIPTION OF THE PREFERRED EMBODIMENTS

The advantages and features of the present invention will become more apparent in the light of following description of embodiments thereof, as illustrated in the accompanying drawings.

Figure 1:
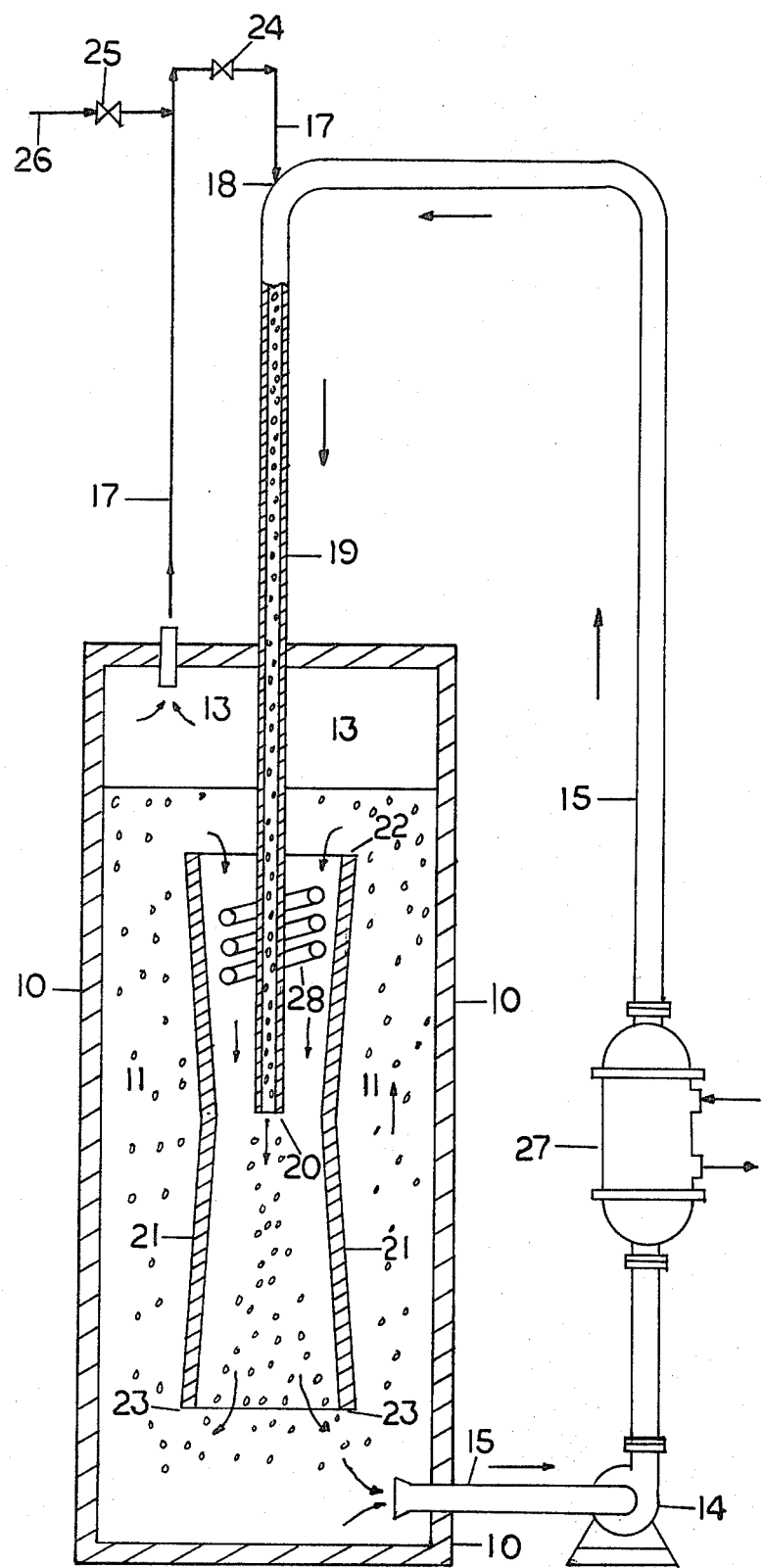

Referring to FIG. 1, reactor vessel 10 contains a liquid 11 with a free surface 12 which is in contact with the gas space 13. Pump means 14 withdraws liquid continuously from the reactor 10 through a flow conduit 15 and lifts the liquid to a certain height within the flow conduit 15, which may be at least eight feet above the liquid surface. Due to the change of the gravitational position low pressure is created within the flow conduit at said predetermined height. There is a gas conduit 17 communicating the reactor gas space 13 with the flow conduit 15 for admitting the gas to the liquid flow. The gas is entrained in the flow conduit 15 by the low pressure of the liquid flow. A gas-liquid mixture is formed downstream of the gas openning 18 which is then guided to flow downwardly in a substantially vertical tube 19. The gas-liquid mixture is discharged in an eductor 21 which is submerged in the reactor liquid with its inlet and outlet open to the reactor liquid. The discharge flow from the vertical tube 19 acts as a driving jet which mixes with the liquid in the eductor and induces a secondary flow; it draws the reactor liquid in the eductor from the upper end 22 and discharges it from the lower end 23 to the liquid body of the reactor. The gas-liquid mass transfer is thereby accomplished by the actions of gas entrainment, gas liquid mixing in the vertical tube, gas liquid mixing in the eductor and gas dispersing in the reactor liquid. The feed gas is introduced through a pipe 26 and a valve 25 which controls the flow rate of the feed gas. The feed gas can be introduced to the reactor gas space or directly to the liquid flow conduit 15, it depends on the process requirement. The gas recirculating rate is controlled by the valve 24 which in turn determines the gas-liqud ratio in the down flow tube 19.

If the reactor liquid contains foams, the foams must be suppressed to certain level in order to continue the reaction. In this case, the upper end of the eductor 21 is purposely disposed close to the liquid surface 12 so that foams can be drawn in the eductor and suppressed therein.

Heat exchange coil 28 is disposed inside the eductor 21 for providing heat transfer between the coil and the liquid promoted by the secondary flow in the eductor. Additional heat exchange is provided by an external heat exchanger 27 which is connected to the flow conduit 15. Heat transfer takes place between the circulating liquid in the conduit and the external heat exchanger 27.

Figure 2:
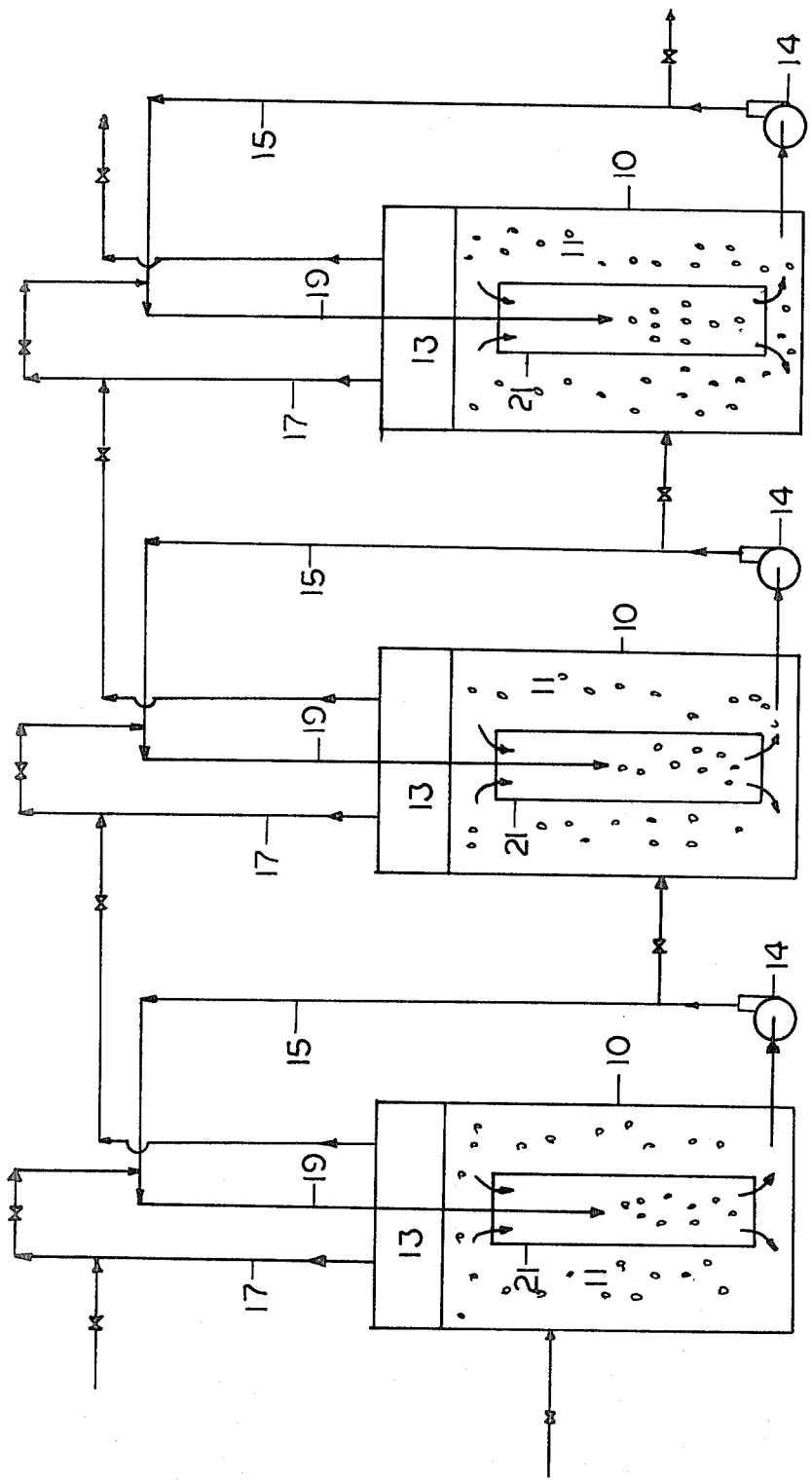
Figure 3:
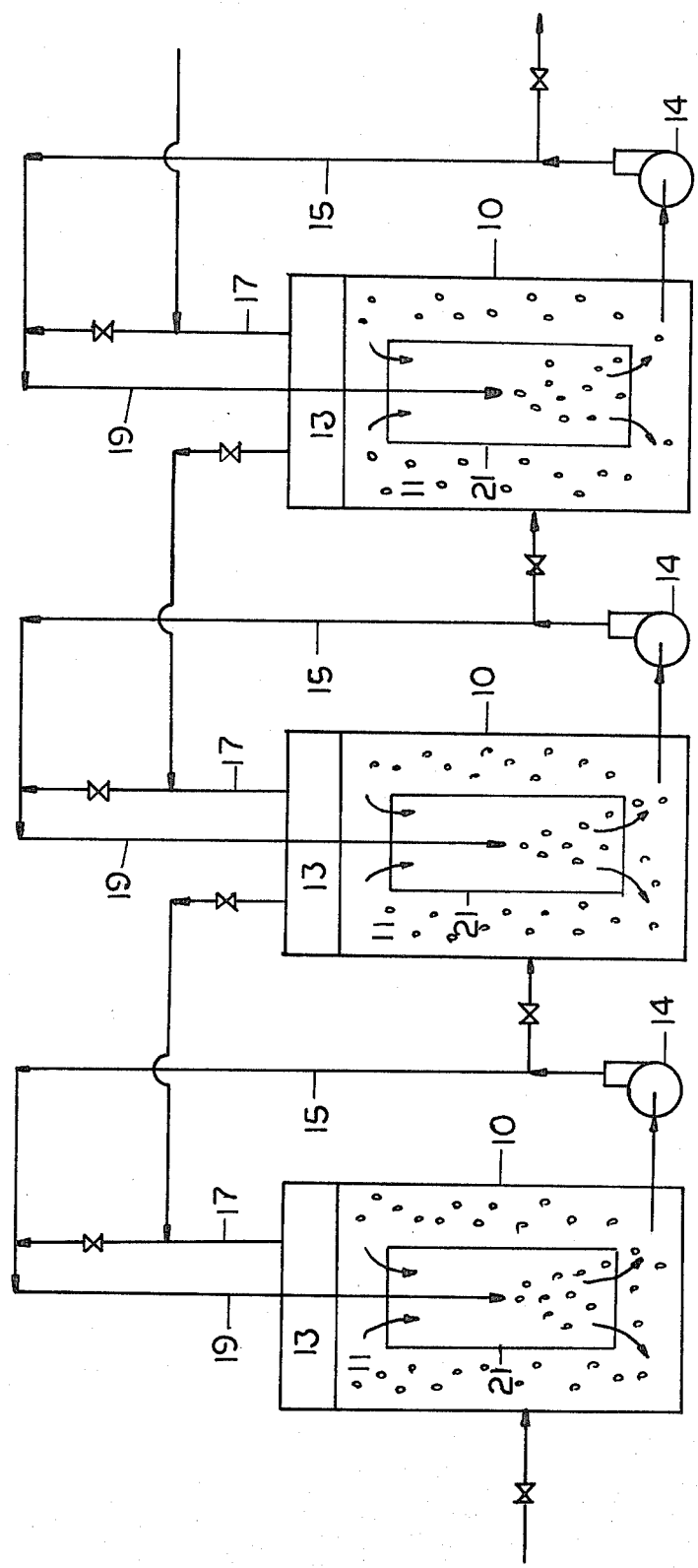

FIG. 2 shows a concurrent staging application of the present invention where the feed gas and the feed liquid are introduced to the first stage and the flow concurrently t the next stage until the reaction is completed to desired level. The present invention can be also applied to countercurrent gas-liquid reaction process as shown in FIG. 3. In each staging application, the feed gas to a individual stage can be admitted to the reactor gas space or directly to the liquid circulating flow for entrainment while the feed liquid either feed to the pump inlet pipe or to the reactor.

I claim:

1. A process for promoting gas-liquid reaction in a reactor comprising the steps of; continuously circulating liquid contained in a reactor by removing the liquid by a pump within a recirculating conduit circuit;

pumping said liquid to a substantially vertical return conduit in said circuit, said return conduit extending a predetermined height above the liquid, said height being sufficiently high that is produces a low pressure section in the return conduit;

admitting said gas to said flow conduit at said low pressure section to entrain said gas in said conduit and forming a gas-liquid mixture therein downstream of the gas entrainment;

guiding said gas-liquid mixture flowing downwardly return conduit;

injecting said gas-liquid mixture from the lower end of said return conduit in at least one eductor means below said liquid surface, said eductor means being submerged in said liquid with its inlet and outlet open to said liquid of said reactor, utilizing the injecting flow of said mixture as driving jet to induce a secondary flow in said liquid of said reactor through said eductor means;

whereby the gas bubbles contained in said injecting flow further mix with said secondary flow in said eductor means and subsequently flow in the main body of the reactor liquid, wherein said gas continuously contacting with said liquid of said reactor while rising up to said liquid surface.

2. A process according to claim 1, it further comprising heat exchange for controlling the reaction temperature, wherein at least one heat exchanger being connected to said flow conduit for exchanging heat with the circulating liquid of said flow conduit.

3. A method according to claim 2 wherein said reaction being fermentation, said liquid being fermentation mixed liquor, said gas being oxygen containing gas.

4. A process according to claim 1, it further comprising heat exchange for controlling the reaction temperature, wherein at least one heat exchange surface being disposed in said reactor submerged in said liquid, said injecting flow and said secondary flow promoting an efficient heat exchange between said liquid and said heat exchange surface.

5. A process according to claim 4 wherein said heat exchange surface being disposed inside of said eductor means.

6. A process according to claim 4 wherein said reaction being fermentation, said liquid being fermentation mixed liquor, said gas being oxygen containing gas.

7. A process according to claim 1 wherein said eductor means being an upright flow baffle.

8. A process according to claim 7 wherein said upright baffle being a circular tube disposed at central location of said reactor.

9. A process according to claim 1 wherein said predetermined height being at least eight feet above said liquid surface.

10. A process according to claim 1 wherein said reaction being biological purification of wastewater, said gas being air, said liquid being wastewater, said reactor being an open top reactor.

11. A process according to claim 1 wherein said reaction being biological purification of wastewater, said gas being oxygen enriched gas, said liquid being wastewater, said reactor being closed top reactor.

12. A process according to claim 1 wherein the entrained gas comprising at least a portion of fresh gas fed to said reactor.

13. A process according to claim 1 wherein at least a portion of feed liquid being fed to said flow conduit upstream of said pump means.

14. A process for promoting gas-liquid reaction comprising at least two concurrent stages of said process defined in claim 1.

15. A process for promoting gas-liquid reaction comprising at least two countercurrent stages of said process as defined in claim 1.

16. An apparatus for promoting gas-liquid reaction in a reactor vessel comprising said vessel for containing said liquid, a recirculating conduit circuit for removing liquid from said vessel and returning said liquid to said vessel, said circuit including a substantially vertical return conduit extending a predetermined height above the liquid surface, said height being sufficiently high that it produces a low pressure section in the return conduit, at least one gas conduit communicating the gas space of said vessel with said flow condit for allowing said gas to be entrained in said flow conduit at said height, said return conduit being adapted to guide a downward flow downstream of the gas entrainment to an eductor means, said eductor means being submerged in said liquid with its inlet and outlet open to said liquid of said reactor, utilizing the injecting flow of said mixture as driving jet to induce a secondary flow in said liquid of said reactor through said eductor means, whereby the gas bubbles contained in said injecting flow further mix with said secondary flow in said eductor means and subsequently flow in the main body of the reactor liquid, wherein said gas continuously contacting with said liquid of said reactor while rising up to said liquid surface.

17. An apparatus according to claim 16, said eductor means being a hollow cylindrical column substantially vertically disposed in said liquid of said vessel with both the upper and lower ends open to said liquid; said secondary flow being drawn from said upper end of said column and discharged to the liquid body of said vessel through said lower end of said column.

18. An apparatus according to claim 16 further comprising at least one heat exchange surface submerged in said liquid of said reactor vessel for performing heat transfer between said liquid and said heat exchange surface.

19. An apparatus according to claim 16 further comprising at least one heat exchanger connecting to said flow conduit for performing heat transfer between the circulating liquid in said conduit and said heat exchanger.

20. An apparatus according to claim 16 further comprising a gas flow control valve for controlling the flow rate of gas entrainment flowing through said gas conduit.

* * * * *